United States Patent [19]

Jönsson et al.

[11] Patent Number: 5,755,959

[45] Date of Patent: May 26, 1998

[54] DEVICE FOR SUPPLYING A SUSPENSION TO A FILTER AT DIFFERENT LEVELS WITHIN THE FILTER AND IN PROPORTIONS SUCH THAT A UNIFORMLY DISTRIBUTED FLOW OF SUSPENSION IS ACHIEVED ACROSS THE FILTER AREA

[75] Inventors: Kurt Jönsson; Lennart Lenvik, both of Nynäshamn; Magnus Hagrot, Saltsjö-Boo; Jonas Oskarsson, Nynäshamn, all of Sweden

[73] Assignee: Nordic Water Products AB, Nynäshamn, Sweden

[21] Appl. No.: 525,728

[22] PCT Filed: Mar. 24, 1994

[86] PCT No.: PCT/SE94/00267

§ 371 Date: Sep. 25, 1995

§ 102(e) Date: Sep. 25, 1995

[87] PCT Pub. No.: WO94/22547

PCT Pub. Date: Oct. 13, 1994

[30] Foreign Application Priority Data

Mar. 26, 1993 [SE] Sweden .................. 9301018

[51] Int. Cl.⁶ .................................. B01D 24/28
[52] U.S. Cl. .......... 210/189; 210/268; 210/269; 210/274; 210/792
[58] Field of Search .................. 210/767, 786, 210/791, 792, 801, 807, 188, 197, 793, 248, 269, 274, 275, 189.268; 95/185, 186; 96/204

[56] References Cited

U.S. PATENT DOCUMENTS

| | | |
|---|---|---|
| 3,667,604 | 6/1972 | Lagoutte .................. 210/136 |
| 3,767,048 | 10/1973 | Prengemann .................. 210/786 |
| 4,102,790 | 7/1978 | Portyrata .................. 210/293 |
| 4,126,546 | 11/1978 | Hjelmner et al. .................. 210/786 |
| 4,246,102 | 1/1981 | Hjelmner et al. .................. 210/786 |
| 4,720,347 | 1/1988 | Berne .................. 210/792 |
| 4,842,744 | 6/1989 | Schade .................. 210/792 |
| 5,173,194 | 12/1992 | Hering, Jr. .................. 210/792 |
| 5,277,829 | 1/1994 | Ward .................. 210/792 |
| 5,573,671 | 11/1996 | Klein .................. 210/792 |

FOREIGN PATENT DOCUMENTS

| | | |
|---|---|---|
| 0 074 342 | 8/1982 | European Pat. Off. . |
| 0 121 143 | 3/1984 | European Pat. Off. . |
| 20 42 353 | 3/1972 | Germany . |
| WO91/08818 | 6/1991 | WIPO . |
| WO81/02393 | 9/1991 | WIPO . |

*Primary Examiner*—Robert Popovics
*Attorney, Agent, or Firm*—Jacobson, Price, Holman & Stern, PLLC

[57] ABSTRACT

A suspension is delivered to a filter bed comprised of granular filter medium in a continuously working filter at the lower part of the bed and is then permitted to flow upwards through the bed. With the intention of optimizing the capacity of the filter, the suspension is now guided into a central region of the bed. The suspension is divided from this region into at least two specific proportional quantities which are each led from the filter bed in a respective ring-shaped pattern at mutually different heights in relation to the extension of the bed, these ring-shaped patterns having different diameters and each being adapted to the extension of the filter medium in the direction of the diameter.

8 Claims, 1 Drawing Sheet

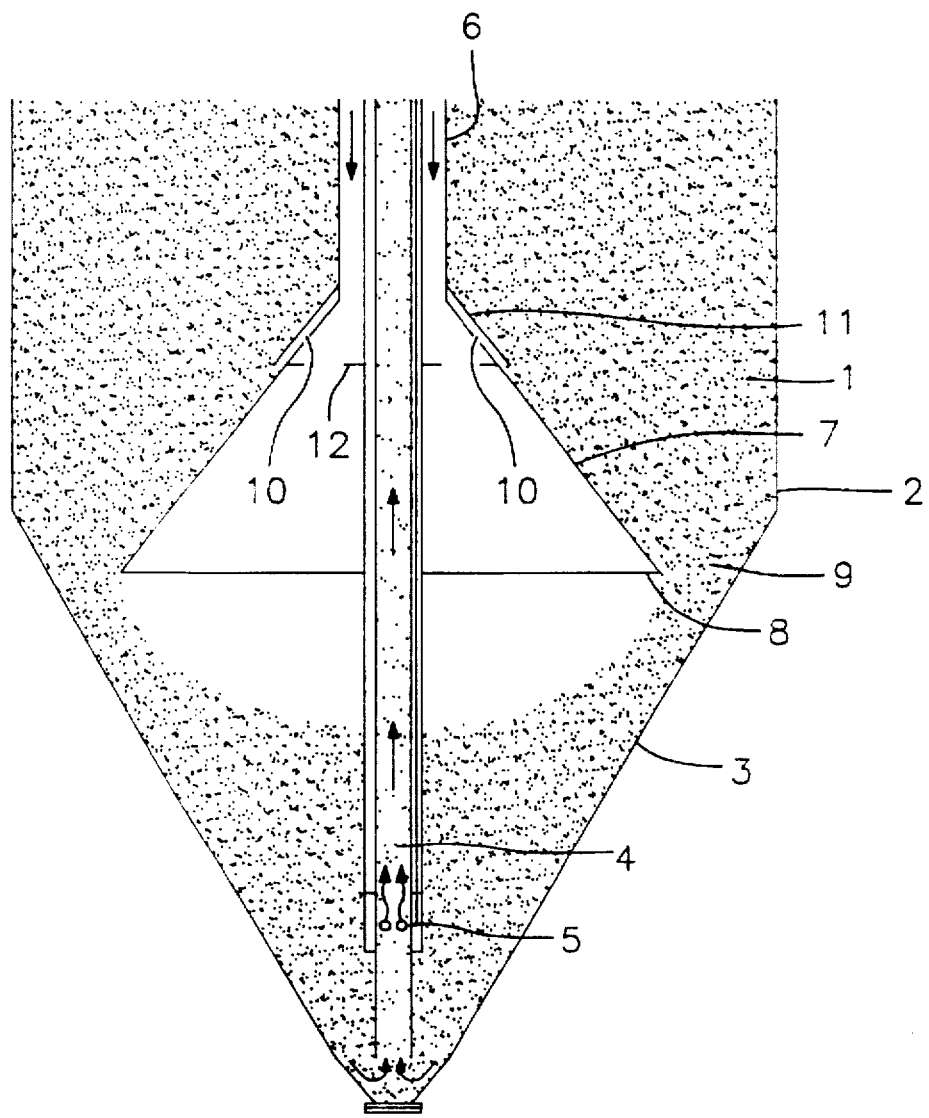

DEVICE FOR SUPPLYING A SUSPENSION TO A FILTER AT DIFFERENT LEVELS WITHIN THE FILTER AND IN PROPORTIONS SUCH THAT A UNIFORMLY DISTRIBUTED FLOW OF SUSPENSION IS ACHIEVED ACROSS THE FILTER AREA

BACKGROUND OF THE INVENTION

The present invention relates to methods and devices for achieving a uniformly distributed flow of suspension through a granular filter bed in a continuously working filter. The invention therewith achieves optimization of the capacity of the filter.

By a continuously working granular filter is meant here and in the following any type of filter in which filter medium is removed continuously from the bottom of the filter bed, washed and then returned to the upper side of the filter bed as suspension passes through the filter bed and cleaned thereby. An example of one such filter is described in Swedish Patent Specification 7602999-0. The particulate filter medium, normally sand, is enclosed in a circular or polygonal container which has a conical or pyramidal bottom. The suspension or emulsion to be treated is taken in through an inlet at the bottom of the filter bed. The suspension or emulsion flows into the filter bed through a number of pipes whose orifices are located beneath a roof or ceiling structure. The orifice of a lifting device, conveniently a mammoth pump or air lift, is placed in the lowermost part of the conical bottom. Such a pump uses air as the transporting medium. The pump pipe or tube extends up through the filter bed to a washing device, from which washed sand is distributed over the upper side of the filter bed. The incoming suspension thus flows in countercurrent to the filter medium outwards through the filter bed towards progressively more cleaner filter medium and leaves the filter through an outlet, via a weir means. A cone is positioned in the lower part of the filter bed with the apex of the cone facing upwards, so as to contribute to a desired flow profile of the filter medium. This cone is referred to in the following as a guide one.

The known technique includes several solutions to the problem of introducing the suspension into the filter bed in a manner which will result in a uniformly distributed flow over the filter area. Known to the art are devices which distribute the suspension in different directions out towards the periphery with the aid of radially extending arms. Other inlets take place around the outer wall and also further in towards the center. A common feature of all solutions is an assumption that precisely this or that solution will provide a uniformly distributed flow throughout the whole of the filter. This assumption remains hypothetical unless it can be proved to be true with the aid of concrete measurements. The difficulties in taking such measurements have evidently presented such a large obstacle to obtaining a true picture of prevailing realities that the matter has quite simply been ignored.

SUMMARY OF THE INVENTION

The present invention is based on a large number of measurements of the flow conditions that were taken at a plurality of measuring points distributed both radially and axially in the filter bed. The result of these measurements was surprising. Two very essential observations could be made. Firstly, it was found that the flows had a very strong tendency to curve out towards the outer surface of the filter immediately downstream of the inlet. Those inlet devices that were placed adjacent the outer surface and also slightly inwards of the outer surface produced an equally as large flow within the 30% of the total area that lay proximal to the outer surface as in the whole of the remainder of the filter. In hydro-mechanical terms, it is possible that this was due to a smaller grain density of the filter material around the outer surface or mantle of the filter bed. Secondly, it was found that the flatness of the upper surface of the filter bed had a strong influence on the flows in an area located some decimeters beneath the surface. The upper surface of the filter bed had an undulating configuration, presenting ridges or crests, and the liquid flows deviated beneath parts of the upper surface and were directed towards the nearest troughs of the undulations. The important conclusion that can be drawn from these observations is that the filter bed was not utilized to an optimum and that there was much to gain from an optimally utilized filter bed. One characteristic feature of an optimally utilized filter bed is that each small part of the filter bed is utilized to a maximum for filtering purposes irrespective of where this part is located in the filter bed, i.e. that equally large suspension flows will pass through the bed. When such is the case, it is possible to increase the total flow through the filter to a higher level without lowering the extent to which the suspension is cleaned. Alternatively, the amount of filter medium can be decreased, resulting in a lower total height, construction height, of the filter.

A large number of measurements taken in filters having varying suspension inlet conditions and with varying suspensions right down to clear solutions have given conditions for one such optimally utilized filter and have led to the present invention. A major part of the suspension flow shall be led into the filter bed where the filter area is momentarily the smallest, this area, at the same time, being the area in which the fall rate of the filter medium is the greatest. One such area is found at the lower edge of the guide cone, this edge normally being located in that region where the beginning of a bottom cone is found. It has been found that a uniformly distributed flow can be achieved in the outer region of the outer surface by allowing the suspension to flow-in around the edge of the guide cone.

However, it was also found that it was not possible to allow the whole of the suspension to flow-in around the bottom edge of the guide cone, since the surface load in the confined filter area then becomes too high, causing suspended particles to be torn loose from the sand grains. Neither could a uniformly distributed flow be obtained over the whole of the filter area or completely up through the whole of the filter. It was found necessary to also introduce part of the suspension very centrally to the filter bed. This part of the suspension quantity enters at a later stage in the filter bed and fills-out that area of the filter that has not been filled satisfactorily from the lower edge of the guide cone. The uniformly distributed flow can be obtained over the whole of the filter area and through the major part of the filter, by adapting the distribution of suspension to the two inlet regions. The invention has obtained the characteristic features set forth in the following claims against the background of the aforesaid.

According to one refined embodiment of the invention for optimal utilization of the whole of the filter the upper surface of the filter bed is totally flat.

BRIEF DESCRIPTION OF THE DRAWINGS

The invention will now be described in more detail with reference to the accompanying drawing, the single figure of which illustrates schematically the lower part of the continuously working filter in accordance with the invention.

DESCRIPTION OF A PREFERRED EMBODIMENT

The drawing illustrates schematically how the introduction of a suspension to the filter bed can be achieved in accordance with the invention. The lower part of a filter bed 1 is enclosed by means of a preferably circular shell or mantle 2 and a bottom cone 3. The transport pipe 4 of an air pump, extends centrally through the filter bed and extends up to a filter medium washing device (not shown) and to an air delivery pipe 5 which delivers air to the pump. A suspension delivery pipe 6 extends concentrically around the pump and exits into the upper part of the guide cone 7. The guide cone 7 has an open bottom and part of the suspension is intended to flow out into the filter bed around the lower edge 8 of the cone and into the confined region 9 between the guide cone 7 and the bottom cone 3. A number of holes 10 are disposed around the upper part of the guide cone in a circular path, so that the suspension is able to flow relatively centrally into the filter bed 1. In the illustrated case, the holes 10 are shielded from the filter medium by means of a conical collar 11 placed immediately outside the holes. In the illustrated case, suspension flows into the filter bed around the lower edge of the collar 11. In another embodiment according to the invention, each hole is shielded from the filter medium by means of an outwardly lying cover or lid. The holes may also be placed around circular paths on different cone heights. The flow obstacle or barrier 12 is provided below the holes 10 within the guide cone. These barriers are intended to retard the powerful kinetic energy that is imparted to the suspension through the vertical infeed channel 6, and also to distribute the suspension volumes to the lower part of the guide cone and to the holes in the upper part of said cone respectively, in desired proportions. The flow barrier 12 may conveniently have the form of a horizontal plate attached to the guide cone and provided with a plurality of holes. In this case, the holes are suitably placed so that the suspension entering from the pipe 6 will not impinge on the holes, but will be retarded.

In the case of another embodiment according to the invention it is not necessary for the more central infeed of suspension to take place through holes provided in the guide cone, and the holes may be placed directly on the suspension delivery pipe 6 immediately above the upper part of the guide cone. It is also necessary in the case of this embodiment to provide suspension flow barriers either in the pipe or in the upper part of the guide cone. It is not necessary, on the other hand, to shield these holes with cover plates or collars.

In order to obtain a uniform flow into the filter bed around the lower edge of the guide cone and also at the edge of the upper collar it is necessary for the edges to be orientated horizontally and to be rigidly held in this position. In order to facilitate an even flow of suspension into the filter bed, the aforesaid lower edge is conveniently provided with notches in some form or another, for instance in the form of triangular recesses, serrations, not shown.

Notwithstanding the composition of the suspension, it has been found suitable to permit more than 65% of the suspension, but not more than 80% thereof, to be led into the filter bed around the lower edge 8 of the guide cone and the remainder of the suspension relatively centrally through the holes 10 provided in the upper part of the guide cone. In addition, the bottom edge of the guide cone will preferably be spaced from the vertical defining surface of the filter or an imaginary extension of the filter by a distance which constitutes at least one third of a radius within the filter medium, and the inner edge beneath the collars or like devices will preferably be spaced from the inner surface of the filter medium by a distance of less than ⅓ of the radius within the filter medium, i.e. in the case of the illustrated embodiment against the infeed pipe.

Devices for obtaining a flat upper surface may have many different configurations. The devices may have the form of expensive rotary scrapers. This should be weighed against the gain afforded by a simpler device which provides an essentially flat upper surface with acceptable slight undulations in the filter medium. A compromise may be found in a distributor cone which is located beneath the washing device and which has the appearance of a star with a large number of jets radiating out towards the periphery.

The economic gain achieved with a filter which is utilized to an optimum is a palpable gain under all circumstances. The filters will either have a lower structural height already in the project stage and can therewith be accommodated in buildings of smaller heights or can be accommodated in existing buildings, or the number of filters can be made to be fewer in the case of large plants, since a larger volume of suspension can be allowed to pass through each filter.

We claim:

1. A device for introducing a suspension into a filter bed having a granular filter medium in a continuously working filter the device comprising: a centrally located and downwardly open guide cone that embraces a lower part of the filter bed to ensure that the filter medium will obtain a desired flow pattern, the device configured to deliver suspension to an interior of the guide cone in its top region and downwards so that the suspension is led out to the filter bed from the interior of the guide cone and also along the bottom edge of the guide cone at an at least one level above said bottom edge in order to obtain a uniformly distributed flow of suspension across the filter area, said device having infeed pipes which open into a lower part of the filter bed where said downwardly open guide cone is placed centrally with the apex of the cone pointing upwards so as to ensure that the filter medium will obtain the desired flow pattern, wherein an orifice of the infeed pipe lies within the top region of the guide cone, said device further having outlets to the surrounding filter bed which are comprised of a number of openings through a mantle surface of the guide cone located in rows at certain heights on the cone and/or openings through the infeed pipe above the guide cone and passageways along the bottom edge of the guide cone, wherein the openings through the mantle surface of the guide cone are shielded by circumferentially extending collar means which is spaced slightly from said openings through the mantle surface and seals tightly against the outer surface of the guide cone above the openings through the mantle surface.

2. The device according to claim 1, wherein said device is arranged so that the volume of suspension led out at the highest level comprises at least 20% of the total flow, and so that the volume of suspension led out at the lowermost level comprises at least 65% of the total flow.

3. The device according to claim 1, wherein the openings through the mantle surface are disposed along a circular path around the mantle surface of the guide cone.

4. The device according to claim 1, wherein a center axis of the orifice of the infeed pipe coincides with an axis of the guide cone.

5. The device according to claim 1, further comprising a suspension flow barrier located immediately beneath the openings through the mantle surface and which functions to distribute the suspension to the different outlet levels in desired proportions.

6. The device according to claim 3, wherein the openings through the mantle surface are disposed along several circular paths at different heights along the guide cone.

7. The device according to claim 1, wherein the bottom edge of the guide cone is spaced from an outer cylindrical defining surface of the filter bed or from an imaginary extension of the defining surface by a distance equal to at least one third of the radius of the outer cylindrical defining surface.

8. The device according to claim 1, wherein the openings through the mantle surface are spaced from an inner cylindrical defining surface of the filter bed by a distance which is less than one third of the radial extension of the filter bed.

* * * * *